United States Patent [19]

Gillis et al.

[11] Patent Number: 4,990,548

[45] Date of Patent: Feb. 5, 1991

[54] POLYURETHANE/UREA FOAMS EMPLOYING IMINO/ENAMINE FUNCTIONAL COMPOUNDS

[75] Inventors: Herbert R. Gillis, Sterling Heights, Mich.; Malcolm Hannaby, Leuven, Belgium; Jan W. Leenslag, Neerijse, Belgium; Alain Parfondry, Evere, Belgium

[73] Assignees: ICI Americas Inc., Wilm, Del.; Imperial Chemical Industries plc, Millbank, England

[21] Appl. No.: 400,646

[22] Filed: Aug. 30, 1989

[30] Foreign Application Priority Data

Mar. 11, 1987 [GB] United Kingdom ............. 8705801

[51] Int. Cl.$^5$ ............................................. C08G 18/14
[52] U.S. Cl. .................................. 521/163; 121/121; 121/129; 121/130; 121/176
[58] Field of Search .............. 521/163, 121, 129, 130; 523/176

[56] References Cited

U.S. PATENT DOCUMENTS

| | | | |
|---|---|---|---|
| 4,428,983 | 1/1984 | Nehen et al. | 523/176 |
| 4,745,133 | 5/1988 | Grinbergs et al. | 521/163 |
| 4,794,129 | 12/1988 | Gillis, Jr. et al. | 521/163 |
| 4,935,460 | 6/1990 | Cassidy et al. | 521/163 |

*Primary Examiner*—Morton Foelak
*Assistant Examiner*—Duc Truong

[57] ABSTRACT

Polyurethane/polyurea foams are made by reacting an organic polyisocyanate with resins containing imino/enamino-functional groups in the presence of blowing agents. Control of foam properties is offered by selecting imino/enamino-functional groups which decompose with water at the temperature of the reaction to produce volatile gases.

10 Claims, No Drawings

POLYURETHANE/UREA FOAMS EMPLOYING IMINO/ENAMINE FUNCTIONAL COMPOUNDS

This invention relates to polymeric foams and more especially to polymeric foams derived from organic polyisocyanates and to a method for their preparation.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m$^3$ can be made.

The basic chemical reaction taking place in the production of polyurethane/polyurea foams is between the isocyanate groups of a polyisocyanate and the hydroxyl/amino groups of an organic polyol/polyamine. It has now been found that useful polymeric foams having varying density, rigidity and texture may be prepared by reacting organic polyisocyanates with certain imino-functional or enamine-containing compounds.

Thus, according to the invention, there is provided a method for the preparation of polymeric foams which comprises reacting an organic polyisocyanate under foam-forming conditions with an imino-functional or enamine-containing compound having a molecular weight of at least 1000.

Unless otherwise stated, the expressions "equivalent weight" and "molecular weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

Organic polyisocyanates which may be used in the method of the invention include aliphatic, cycloaliphatic and aralophatic polyisocyanates, for example 1,6-hexamethylene diisocyanate, isophorone diisocyanate, cyclohexane-1,4-diisocyanate, 4,4'-dicyclohexylmethane diisocyanate and p-xylylene diisocyanate, but especially those aromatic polyisocyanates conventionally used in the manufacture of polyurethane and polyisocyanurate foams. Of particular importance are the tolylene diisocyanates (TDI) and diphenylmethane diisocyanates (MDI) in their various pure, modified and crude forms. Special mention may be made of the so-called MDI variants (diphenylmethane diisocyanates modified by the introduction of urethane, allophanate, urea, biuret, carbodiimide, uretonimine or isocyanurate residues) and crude MDI (polymethylene polyphenylene polyisocyanate mixtures). Imino-functional compounds which may be used in the method of the invention are imino-functional compounds capable of reacting directly with polyisocyanates without prior cleavage of the C=N bond to form a monomeric by-product. It is, however, within the scope of the invention to make use of the in situ hydrolysis of imino-functional and/or enamine-containing compounds, regardless of their molecular weight, to produce volatile products which can be used to assist in the expansion of the foam.

Especially suitable imino/enamino-functional compounds include imino/enamino-functional polyether resins having molecular weights of at least 1000, preferably 2000 to 8000, and up to 12,000, and an average imino/enamino-functionality of at least 1.1, preferably from about 2 to about 4.

"Imino-functional" as used herein means that a reactant contains the grouping:

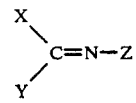

wherein X, Y and Z are chemical moieties which collectively form the rest of said compound and are each independently selected from hydrogen and organic radicals which are attached to the imino unit:

C=N— of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X, Y and Z are attached through saturated atoms, preferably aliphatic carbon atoms.

The range of imino functional reagents which may be used in the invention is not limited by or to any particular chemistry for the preparation of said reagents. For example, imine terminated aliphatic polyethers may be made by a number of different routes. Specifically, the amine groups (—NH$_2$) of an aliphatic amine-terminated polyether can be prereacted with an aldehyde (R$^1$—CH$_2$CHO) or a ketone (R$^1$—CO—R$^2$) to form, respectively, the corresponding aldimine

—N=CHCH$_2$R or the corresponding ketimine

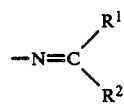

wherein R, R$^1$, and R$^2$ are hereinafter defined, or the aldehyde and/or ketone groups, of an aldehyde and/or ketone-terminated polyether, can be prereacted with an aliphatic primary mono-amine to form, respectively, the corresponding aldimine and/or ketimine-terminated polyethers:

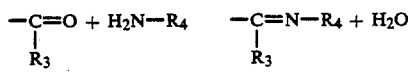

wherein: R$_3$=H or alkyl, R$_4$=H or alkyl, R$_3$ and R$_4$ being more fully defined hereinafter.

The direct reaction of compounds containing isocyanate groups with compounds containing imine groups is known, see "New Developments in Polyketimine-Polyisocyanate Chemistry and Their Application"; ACS-PMSE preprints; Fall-1986 meeting; pp 448–456, U.S. Pat. No. 3,789,045 and GB patent 1286246. It is also known to react polyisocyanates with polyamines in a reaction moderating solvent such as ketone or aldehyde solvents, see U.S. Pat. No. 3,892,696 to Wood and U.S. Pat. No. 3,897,585 (also to Wood) which is a Continuation-in-part thereof. It is also known to react aliphatic polyisocyanates with mixtures of polyamines and polyimines as disclosed in U.S. Pat. No. 4,554,299 to Ligget. It is also well known to react polyisocyanates with polyimines in the presence of moisture whereby the purpose of the moisture is to hydrolyse the imine and liberate free amine which in turn reacts with the isocyanate present. This indirect process of reacting polyimines and polyisocyanates is described, for example, in European patent 149,765 to Arendt. As mentioned above, it is an optional feature of the invention to utilise the indirect process in the production of foams as a means of generating foam-forming gas.

Many types of imino-functional compounds are useful in this invention, including (but not limited to) those listed in Table A, following:

TABLE A

| TYPE | |
|---|---|
| $\text{(P)}-R^5-\underset{\underset{R^6}{\mid}}{C}=N-R^7$ | Simple imine |
| $\text{(P)}-R^5-O-\underset{\underset{R^6}{\mid}}{C}=N-R^7$ | Imino ester |
| $\text{(P)}-Ar-O-\underset{\underset{R^6}{\mid}}{C}=N-R^7$ | Imino ester (aromatic) |
| $\text{(P)}-R^5-N=\underset{\underset{R^7}{\mid}}{\overset{\overset{R^6}{\mid}}{C}}$ | Simple imine |
| $\text{(P)}-R^5-NR^6-\underset{\underset{R^7}{\mid}}{C}=N-R^8$ | Amidine |
| $\text{(P)}-R^5-N=C\underset{\diagdown Ar'}{\overset{\diagup R^6}{}}$ | Simple imine (aromatic) |
| $\text{(P)}-R^5-NR^6-\underset{\underset{R^7}{\mid}}{C}=N-Ar'$ | Amidine (aromatic) |
| $\text{(P)}-R^5-\underset{\underset{OR^7}{\mid}}{C}=N-R^6$ | Imino ester (aliphatic) |
| $\text{(P)}-R^5-\underset{\underset{OAr'}{\mid}}{C}=N-R^6$ | Imino ester (aromatic) |
| $\text{(P)}-R^5-NH-\underset{\underset{NHR^6}{\mid}}{C}=NR^6$ | Guanidine |
| $\text{(P)}-R^5-NR^7-C\underset{\diagdown NR_2^8}{\overset{\diagup NR^8}{}}$ | Guanidine |
| $\text{(P)}-R^5-NH-\underset{\underset{NHAr'}{\mid}}{C}=NAr'$ | Guanidine (aromatic) |

TABLE A-continued

| TYPE | |
|---|---|
| $\text{(P)}-R^5-O-\underset{\underset{NHR^6}{\mid}}{C}=N-R^6$ | Isourea |
| $\text{(P)}-R^5-O-\underset{\underset{NH_2}{\mid}}{C}=N-R^7$ | Isourea | wherein:

$R^5$ and Ar are divalent aliphatic and aromatic organic linking groups, respectively;

(P) represents a polyether or hydrocarbon chain or radical, to which said imino (C=N) functional group is attached as indicated by the drawings.

$R^6$ is H or a monovalent organic aliphatic group of 1 to 10 carbons:

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R^5$ may in particular be propylene, Ar methoxyphenylene, $R^6$ propyl, $R^7$ propyl, $R^8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated. When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature. Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E. A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates. The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines". The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds : Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds : The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

Enamine-containing compounds which may be used in the method of the invention include compounds having the structures

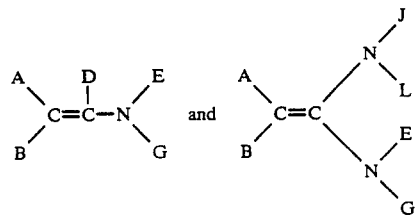

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

In many preferred enamino-functional compounds, E, G, J and L are not hydrogen. It is also preferred that not both of A and B are hydrogen. Especially useful enamino-functional compounds contain two or more enamino groups as a result of A, B, D, E, G, J and/or L being a radical terminating in one or more enamino groups.

Preferred enamino-functional compounds include enamino-functional polyether resins having molecular weights of at least 1500, especially 2000 to 8000, and up to 12,000, and an average enamine functionality of at least 1.1, preferably from about 2 to about 4.

Suitable enamino-functional compounds may be obtained in known manner by reacting a carbonyl compound containing at least one alpha-hydrogen-atom, for example an aliphatic, cyclic-aliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,342,841 and 4,552,945.

If desired, the imino-functional or enamine-containing compounds may contain amide, imide, thioether, siloxane or other linkages in addition to, or instead of, ether linkages provided that these are chemically inert towards the imino or enamine end groups.

The expression "foam-forming conditions" used herein means conditions already known for the formation of polymeric foams, for example polyurethane foams. Thus, the reaction mixture may contain dissolved or dispersed gases which may be injected therein or may be generated in situ by a chemical reaction or by the vaporisation of volatile liquids. Preferred reaction mixtures contain inert liquids having boiling points not exceeding 100° C., preferably not exceeding 50° C., at atmospheric pressure. As examples of such liquids, there may be mentioned hydrocarbons, chlorinated hydrocarbons, fluorinated hydrocarbons and chlorofluorocarbons.

A foam-forming gas may also be generated by including water in the reaction mixture, the water reacting with the polyisocyanate to produce carbon dioxide and/or with the imine or enamine to form volatile carbonyl compounds. When using imino-functional or enamine-containing ingredients which react rapidly with water under the conditions of storage or processing, any water employed may advantageously be introduced as a separate stream at the time of reaction. To a certain extent, the density of the foam formed can be controlled by the selection of the imino/enamino-functional reactant when foamed with water. Lower density foams may be formed when the aqueous decomposition products of the enamino or imino-functional group form low boiling or low molecular weight products such as those obtained when the chemical moieties A, B, D, X and Y have collectively a total low molecular weight of less than about 60. Representative of such moieties for A, B, D, X and Y are —H, —CH$_3$, —C$_2$H$_3$, —C$_2$H$_5$, —OCH$_3$, and —OC$_2$H$_5$. Decomposition products having boiling points up to about 130° C. are operable while those having boiling points not exceeding 50° (at atmospheric pressure may be preferred. In some instances, decomposition products may further decompose to form carbon dioxide and other low molecular weight gases.

Alternatively, water may be incorporated in minor amounts (up to one mole of water per equivalent of the water-sensitive imino or enamine compound) into the same stream as the imino or enamine ingredients. Other types of imino-functional or enamine-containing compounds, for example oxazolines, imidazolines and guanidines, are less sensitive to hydrolysis and may be stored or processed in the presence of water without difficulty. The types of reactive functional groups which are stable in the presence of water will depend upon the conditions of processing and storage but this can be determined by trial without difficulty.

Imino/enamino-functional ingredients which are less water sensitive at the temperatures of the reaction are more suitable for producing high density foams when water is used as the primary foam-forming agent. Less sensitive imino/enamino compounds are useful in the manufacture of higher density foams when the decomposition products have boiling points in excess of 100° C. at atmospheric pressure. Such compounds wherein the moieties A, B, D, X and Y have a collective molecular weight substantially above 60.

Reaction between the organic polyisocyanate and the imino-functional compound may be effected at normal or elevated temperatures. The foam-forming reaction mixtures may also contain other isocyanate-reactive materials in addition to the materials already mentioned. Examples of such materials include polyamines and polyols, for example those having molecular weights below 1000 already known as chain extenders. Polyols such as ethylene glycol, diethylene glycol, 1,4-butanediol, glycerol and triethanolamine are particularly useful. By varying the proportions of imino-functional or enamine-containing compound and chain extender in the formulation, foams varying in texture from flexible to semi-rigid may be obtained. Further isocyanate-reactive materials which may be present in the foam-forming reaction mixture, for example as chain extenders, include imino-functional and/or enamine-containing compounds having molecular weights below 1000 and preferably containing one or two imino or enamine groups per molecule.

The method of the invention provides advantages in respect of processing speed, foam properties and internal mould release.

In addition to the ingredients already mentioned, the foam forming reaction mixture may contain one or more other conventional ingredients of such reaction mixtures. As examples of other such optional ingredients, there may be mentioned catalysts, surfactants, foam stabilisers, fire retardants, fillers, dyes, pigments and internal mould release agents.

Catalysts which may be used include materials already proposed as catalysts for isocyanate-based foam systems, for examples tertiary amines, tin compounds and alkali metal salts of carboxylic acids.

Surfactants and foam stabilisers which may be used include siloxane-oxyalkylene copolymers.

Thus, in a further aspect of the invention, there is provided a reaction system for use in the preparation of polymeric foams comprising:

(1) an organic polyisocyanate, and
(2) an isocyanate-reactive component containing an imino-functional and/or enamine-containing compound having a molecular weight of at least 1000, a chain extender having a molecular weight below 1000 and a blowing agent.

By suitable choice of ingredients and concentration of blowing agents, the foams made by the method of the invention may be of high density (for example between about 60 kg/m$^3$ and about 200 kg/m$^3$) or low density (for example between about 20 and about 60 kg/m$^3$). Furthermore, the foams may be provided with fillers, reinforcements or facings of the types known in the art. By suitable choice of surfactant, density and processing conditions, the foams may be prepared so as to have open or closed cells or they may be plastic or elastomeric mouldings having integral skins.

Conventional techniques for controlling open cell content, cell size and skin (surface) quality may be used, the foams being produced, as desired, by moulding, spraying or free-rise methods.

The invention is illustrated but not limited by the following Example in which all parts and percentages are by weight.

EXAMPLE 1

A polyol blend was prepared by mixing 100 parts of a triimine (prepared by reacting a polyoxypropylene triamine having a molecular weight of 5000 with cyclohexanone), 8 parts of ethylene glycol, 0.1 part of DABCO 33LV and 15 parts of trichlorofluoromethane. This blend was combined with a uretonimine-modified diphenylmethane diisocyanate at an isocyanate index of 110 by mixing at ambient temperature for 10 seconds at 5000 rpm.

After a cream time of 14 secs, a string time of 37 secs and an end of rise time of 74 secs, a flexible foam was formed.

The following table gives the physical properties of the foams obtained together with the properties of foams obtained from a comparable formulation based on a polyether triol (molecular weight 5000) in place of the triimine.

TABLE B

| PROPERTY | TRI-IMINE | TRI-IMINE | POLYOL |
|---|---|---|---|
| isocyanate index | 110 | 110 | 110 |
| density (kg/m$^3$) | 242 | 240 | 245 |
| hardness (Shore A) | 52 | 50 | 50 |
| indentation hardness (kg force) | 6.9 | 5.8 | 10.0 |
| tensile strength (MPa) | 2.5 | 2.4 | 2.2 |
| elongation at break (%) | 90 | 99 | 90 |
| tear strength (N/m) | 3000 | 3040 | 2800 |
| minimum demould time | 150 | 150 | 120 |

TABLE B-continued

| PROPERTY | TRI-IMINE | TRI-IMINE | POLYOL |
|---|---|---|---|
| (sec) | | | 5 |

EXAMPLE 2

Medium density foams may be prepared by mixing 100 parts of a triimine (prepared by reacting a polyoxypropylene triamine having a molecular weight of 5000 with acetone), 8 parts ethylene glycol, 0.1 part of DABCO 33LV and 2.5 parts of water. This blend is combined with a uretonimine-modified diphenylmethane diisocyanate at a isocyanate index of 111 by mixing at ambient temperature for 10 seconds at 5000 rpm.

EXAMPLE 3

100 parts of poly(oxypropylene)-N-cyclohexylamino crotanate was prepared by reacting poly(oxypropylene)acetoacetate with cyclohexylamine in toluene solvent. Solvent and excess cyclohexylamine was removed by vacuum distillation. The acetoacetate derivative was first prepared by reacting a poly(oxypropylene)triol derived from glycerine having a molecular weight of 5000 with ethylacetoacetate in the presence of a titanate ester catalyst.

This trienamino derivative of polyoxypropylene can then be combined with 8 parts ethylene glycol, 0.1 parts of DABCO 33LV and 15 parts of trichlorofluoromethane. This blend is combined with a uretonamine-modified diphenylmethane diisocyanate at an isocyanate index of 110 by mixing at ambient temperature for at least 10 seconds at 5000 rpm to manufacture a flexible foam.

EXAMPLE 4

According to the procedure of Example 3, flexible foams may be made employing 2 parts water in place of trichlorofluoromethane as a blowing agent.

We claim:

1. A method for the preparation of polymeric foams which comprises reacting an organic polyisocyanate under foam-forming conditions with an imino-functional or enamine-containing compound having a molecular weight of at least 1000, to about 12,000.

2. A method according to claim 1 wherein the organic polyisocyanate comprises a diphenylmethane diisocyanate.

3. A method according to claim 1 wherein the imino-functional compound contains the grouping:

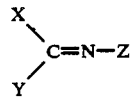

wherein X, Y and Z are chemical moieties which collectively form the rest of said compound and are each independently selected from hydrogen and organic radicals which are attached to the imino unit:

C=N— of said compound through N, C, O, S, Si or P, the central carbon atom of said imino unit being bonded to three atoms.

4. A method according to claim 1 wherein the imino-functional compound is an imino-functional polyether having a molecular weight of at least 1500 and an average imino-functionality from about 2 to about 4.

5. A method according to claim 4 wherein the imino-functional polyether has a molecular weight in the range 2000 to 8000.

6. A method to claim 1 wherein the enamine-containing compound has the structure:

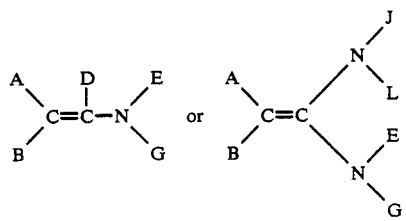

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

7. A method according to claim 6 wherein the enamine-containing compound is an enamino-functional polyether having a molecular weight of at least 1500 and an average enamine functionality from about 2 to about 4.

8. A method according to claim 1 wherein the reaction mixture contains a blowing agent selected from water and inert liquids having boiling points not exceeding 100° C.

9. A reaction system for use in the method of claim 1 comprising:
   (1) an organic polyisocyanate, and
   (2) an isocyanate-reactive component containing an imino-functional and/or enamine-containing compound having a molecular weight of at least 1000, a chain extender having a molecular weight below 1000 and a blowing agent.

10. A method according to claim 8, the improvement which comprises selecting imino-functional compounds and enamino-functional compounds which produce aqueous decomposition products having boiling points at atmospheric pressure up to about 130° C.

* * * * *